United States Patent
Uemura et al.

(10) Patent No.: US 7,145,274 B2
(45) Date of Patent: Dec. 5, 2006

(54) MAGNETOELECTRIC GENERATOR

(75) Inventors: Fumito Uemura, Tokyo (JP);
Mitsuharu Hashiba, Tokyo (JP);
Nobuhiro Kihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/917,369

(22) Filed: Aug. 13, 2004

(65) Prior Publication Data

US 2005/0236916 A1     Oct. 27, 2005

(30) Foreign Application Priority Data

Apr. 27, 2004   (JP)   ............... 2004-131690

(51) Int. Cl.
*H02K 9/00* (2006.01)
*H02K 7/00* (2006.01)

(52) U.S. Cl. ............ 310/74; 310/60 R; 310/60 A

(58) Field of Classification Search ............ 310/58–64, 310/74
See application file for complete search history.

(56) References Cited

U.S. PATENT DOCUMENTS 5,179,872 A * 1/1993 Pernice ............ 74/572.21
6,429,564 B1 * 8/2002 Uemura et al. ............ 310/153
6,662,232 B1 * 12/2003 Nicholls et al. ............ 709/246
2002/0145348 A1 * 10/2002 Anma ............ 310/91

FOREIGN PATENT DOCUMENTS

| JP | 3038781 U | 6/1997 |
| JP | 2002-101630 A | 4/2002 |
| JP | 2003-9441 A | 1/2003 |

* cited by examiner

*Primary Examiner*—Tran Nguyen
(74) *Attorney, Agent, or Firm*—Sughrue Mion, PLLC

(57) ABSTRACT

A magnetoelectric generator includes a bowl-like flywheel (3) having a bottom portion (6) formed with ventilation holes (20), a plurality of permanent magnets (7) secured to an inner circumferential surface of the flywheel (3), a stator core (10) disposed within the flywheel (3) and having peripheral side surfaces facing the permanent magnets (7), and a coil assembly (11) implemented by winding an electric conductor on the core (10). Electricity is induced in the coil assembly (11) by AC magnetic field produced by rotating the flywheel (3). A peripheral edge portion of each ventilation hole (20) is formed with a projecting portion (21) by plastic deformation, which protrudes toward the coil assembly (11) for producing turbulent air flows internally of the flywheel (3) upon rotation of the flywheel (3).

4 Claims, 8 Drawing Sheets

MAGNETOELECTRIC GENERATOR

BACKGROUND OF THE INVENTION

1. Field of the Invention

The present invention relates to a magnetoelectric generator (also known as magneto generator or simply as magneto) for generating electric energy under the effect of an electromagnetic induction produced between permanent magnets and an electricity generating coil assembly by rotating a flywheel.

2. Description of Related Art

As the conventional magnetoelectric generator known heretofore, there has been proposed such one in which ventilation holes are formed in a bottom portion of a flywheel of a substantially bowl-like shape, wherein fins projecting into an inner space defined by the flywheel are formed between the adjacent ones of the ventilation holes. For more particulars, reference may have to be made to, for example, Japanese Patent Application Laid-Open No. 101630/2002 (JP-A-2002-101630).

In the conventional magnetoelectric generator, ventilation efficiency can certainly be enhanced internally of the flywheel by providing the fins, as mentioned above. However, because the fins are formed integrally with the flywheel by resorting to an insert mold forming process, there are required a number of steps for manufacturing the flywheel by using a dedicated resin forming metal mold, as a result of which the manufacturing cost increases, giving rise to a problem.

SUMMARY OF THE INVENTION

It is an object of the present invention to solve the problem mentioned above by providing a magnetoelectric generator of an improved structure which ensures high ventilation efficiency internally of the flywheel while rendering unnecessary the work requiring a number of manufacturing steps and the dedicated resin forming metal mold, to thereby reduce the manufacturing cost.

In view of the above and other objects which will become apparent as the description proceeds, there is provided according to an aspect of the present invention a magnetoelectric generator which includes a flywheel of a substantially bowl-like shape having a bottom portion formed with ventilation holes, a plurality of permanent magnets fixedly secured to an inner circumferential surface of the flywheel, a stator core disposed internally of the flywheel and having peripheral side surfaces facing in opposition to the permanent magnets, and an electricity generating coil assembly implemented by winding an electric conductor on the stator core, wherein electricity is generated under the effect of electromagnetic induction produced between the permanent magnets and the electricity generating coil assembly by rotating the flywheel. A peripheral edge portion of the ventilation hole is formed with a projecting portion by plastic deformation, the projecting portion protruding toward the electricity generating coil assembly for producing turbulent flows of a fluid internally of the flywheel upon rotation of the flywheel.

With the magnetoelectric generator according to the present invention, the manufacturing cost can be reduced while assuring high ventilation efficiency within the inner space of the flywheel.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
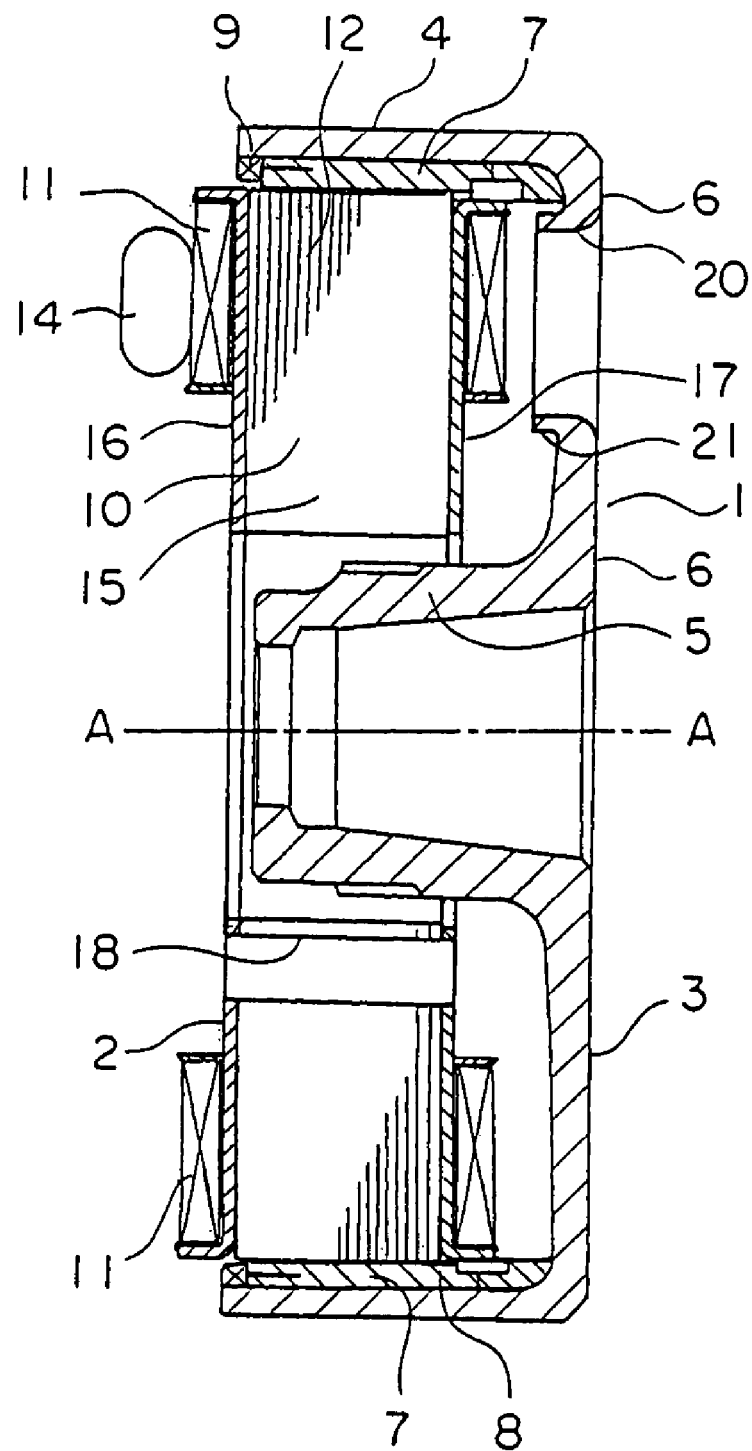
FIG. 1 is a sectional view showing a magnetoelectric generator according to a first embodiment of the present invention.

The present invention will be described in detail in conjunction with what is presently considered as preferred or typical embodiments thereof by reference to the drawings. In the following description, like reference characters designate like or corresponding parts throughout the several views. Also in the description which follows, it is to be understood that such terms as "left", "right", "bottom" and the like are words of convenience and are not to be construed as limiting terms.

Embodiment 1

Figure 2:
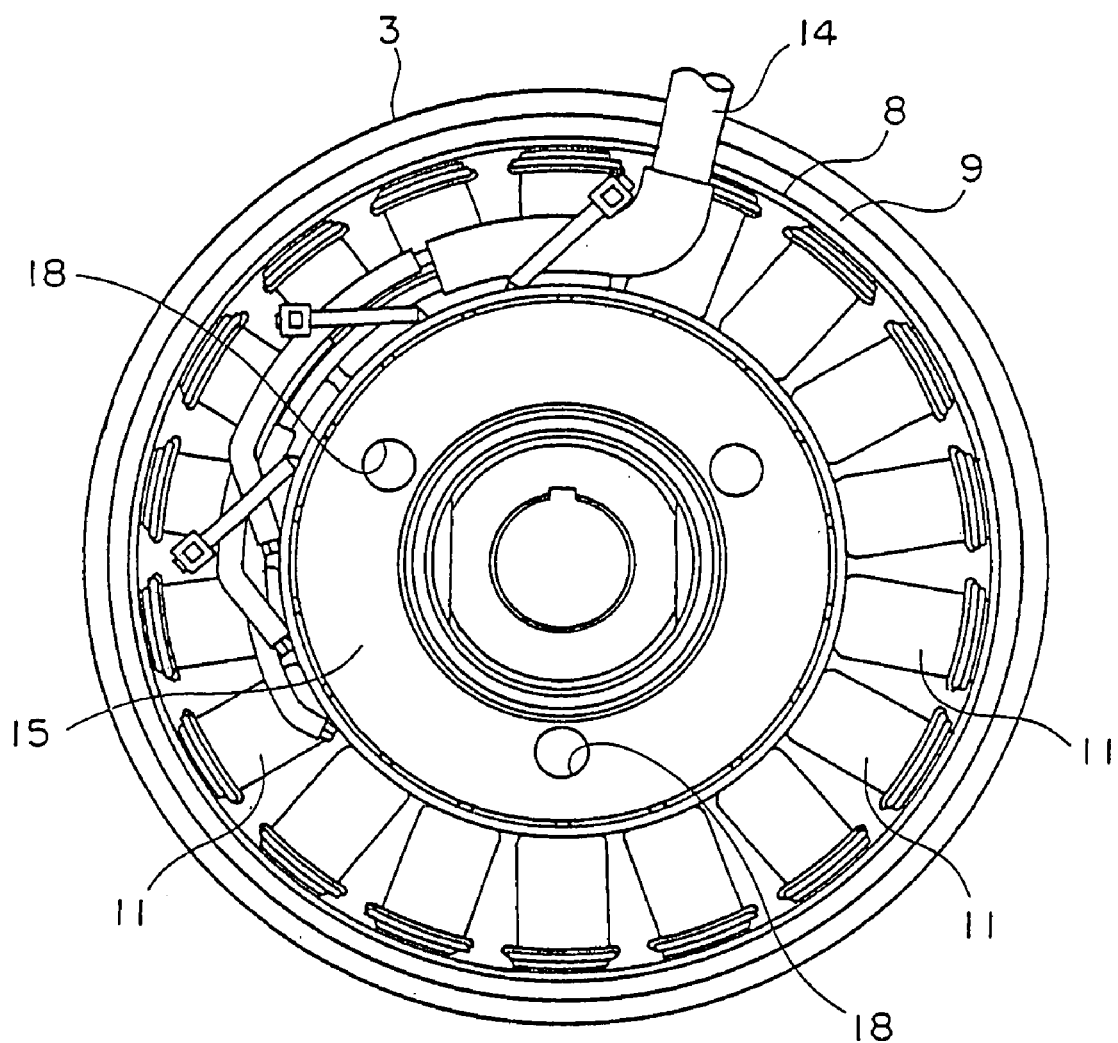
FIG. 2 is a side view of the same as viewed from the left-hand side in FIG. 1.

FIG. 1 is a vertical sectional view showing the magnetoelectric generator according to a first embodiment of the present invention and FIG. 2 is a side view of the same as viewed from the left-hand side in FIG. 1.

Referring to the figure, the magneto generator now under consideration includes a rotor 1 mechanically coupled to an internal combustion engine (not shown) and a stator 2 mounted on a stationary supporting member (not shown either) in opposition to the rotor 1.

The rotor 1 has a flywheel 3 of a substantially bowl-like shape which is composed of an outer peripheral cylindrical portion 4, a boss 5 formed at the inner side of the cylindrical portion 4 and a bottom portion 6 interconnecting the cylindrical portion 4 and the boss 5. The flywheel 3 is mounted rotatably about a rotation axis A—A. The boss 5 is fixedly secured to a rotatable shaft (not shown) driven by the internal combustion engine.

A plurality of permanent magnets 7 are fixedly mounted on the inner peripheral surface of the cylindrical portion 4 of the flywheel 3. These permanent magnets 7 are disposed with an equal angular distance therebetween around the rotation axis A—A. The plurality of permanent magnets 7 are magnetized such that the adjacent permanent magnets 7 exhibit opposite magnetic polarities relative to each other. Consequently, there are produced within the inner space defined by the inner peripheries of the permanent magnets 7 the magnetic fields whose directions change alternately from one to another.

A cylindrical or sleeve-like guard ring 8 is closely or intimately fit onto the inner surfaces of the permanent magnets 7. Both end portions of the individual permanent magnets 7 as viewed in the direction along the rotation axis A—A and gaps formed between the permanent magnets 7 in the circumferential direction thereof are filled with a molded material 9. It is to be noted that by this molded material 9, the plurality of permanent magnets 7 and the guard ring 8 are fixedly secured to the inner surface of the cylindrical portion 4 of the flywheel 3.

Figure 3:
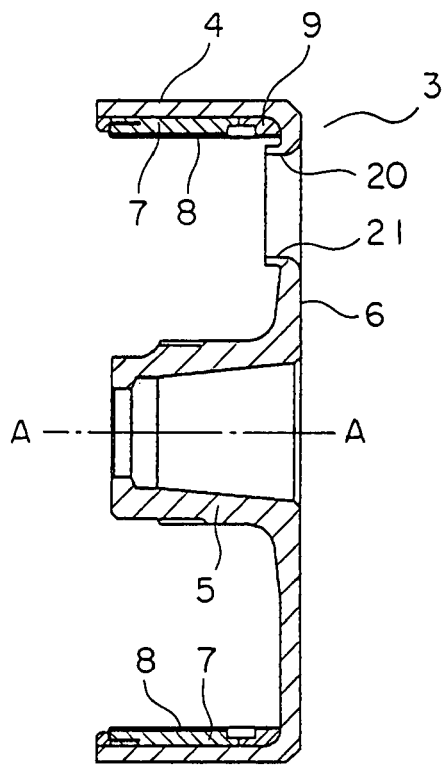
FIG. 3 is a sectional view of a flywheel shown in FIG. 1.
Figure 4:
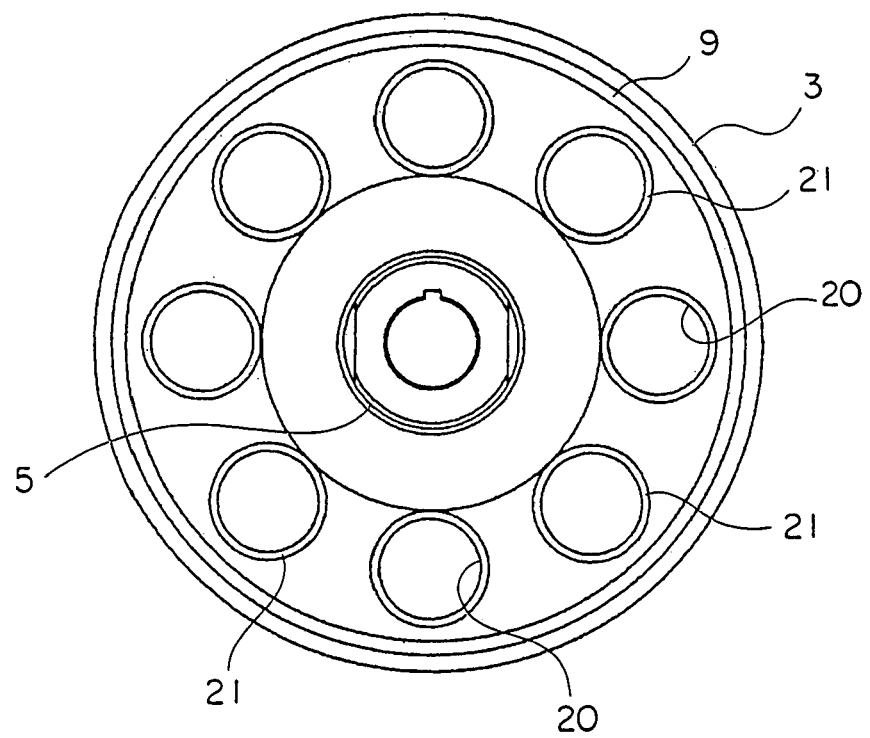
FIG. 4 is a side elevational view of the same as viewed from the left-hand side in FIG. 3.

FIG. 3 is a vertical or longitudinal sectional view of the flywheel 3 shown in FIG. 1, and FIG. 4 is a side elevational view of the same as viewed from the left-hand side in FIG. 3.

Referring to the figures, a plurality of ventilation holes 20 are formed in the bottom portion 6 of the flywheel 3 equi-distantly in the circumferential direction. A projecting portion 21 is formed along the peripheral edge of each ventilation hole 20 by plastic deformation for generating turbulent flows of the air within the flywheel 3 upon rotation thereof. These projecting portions 21 protrude toward the stator 2 along the peripheral edge portion of the individual ventilation holes 20, respectively, and are formed by burring.

The stator 2 includes a stator core 10 formed in a cylindrical hollow column and electricity generating coils 11. More specifically, the stator core 10 is formed with a plurality of teeth 12 on the outer peripheral portion with equi-distance therebetween in the circumferential direction, the teeth extending radially outwardly.

Each of the teeth 12 has an outer peripheral surface wound with an electric conductor constituting the coil 11. The individual coils 11 are mutually interconnected by connecting lead wires 14 to constitute a coil assembly.

The stator core 10 having a plurality of teeth 12 formed on the outer peripheral portion is composed of a laminated core 15 formed by a large number of center-hollowed magnetic steel sheets each made of a cold-rolled steel plate formed appropriately and laminated or stacked in the direction extending along the rotation axis A—A, first and second end plates 16 and 17 superposed intimately on both side surfaces of the laminated core 15, respectively.

The first and second end plates 16 and 17 have respective outer peripheral edge portions bent toward and over the coils 11 for holding the coils 11, respectively. Each of the first and second end plates 16 and 17 made of a cold-rolled steel plate or the like.

Formed in the inner peripheral portions of the laminated core 15, the first end plate 16 and the second end plate 17 at three locations are through-holes 18 whose longitudinal axis extend in parallel with the rotation axis A—A. The laminated core 15 and the first and second end plates 16 and 17 disposed at both sides of the laminated core 15 are secured together in an integral structure through cooperation of clamping bolts (not shown) inserted through the through-holes 18, respectively, and nuts (not shown either) mounted screwwise at one end portions of the bolts, respectively.

In the magnetoelectric generator of the structure described above, the flywheel 3 is caused to rotate in linkage with the rotatable shaft driven by the internal combustion engine, whereby electric energy is generated in the coils 11 under the action of alternating fields produced by the permanent magnets 7. The AC power outputted from the magnetoelectric generator is rectified by a rectifier diode circuit (not shown) to be supplied to a load such as an on-vehicle battery.

Figure 5:
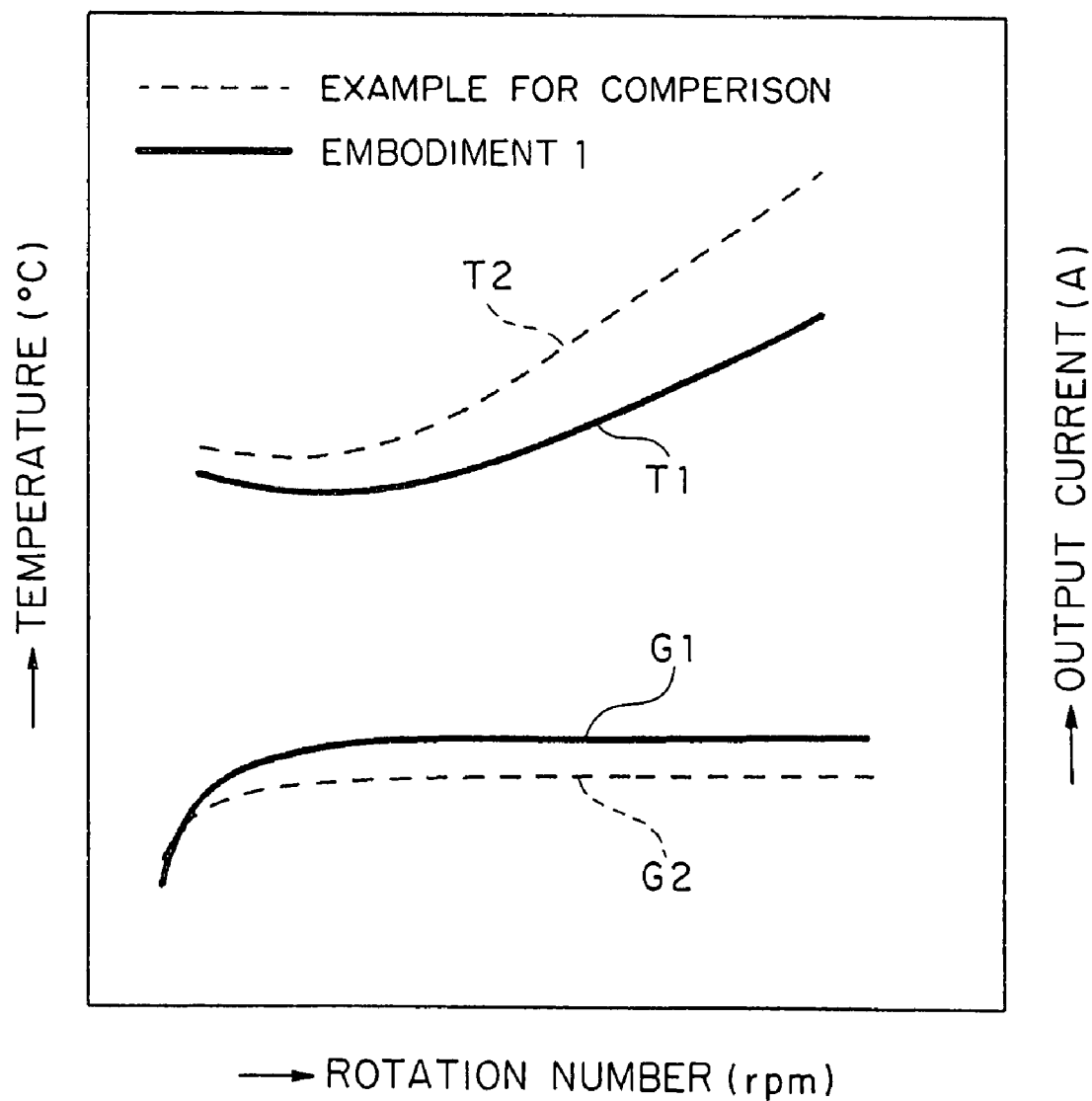
FIG. 5 is a view for graphically illustrating temperature characteristic and heat generation characteristic of an electricity generating coil assembly of the magnetoelectric generator shown in FIG. 1.

FIG. 5 is a view for graphically illustrating temperature characteristic (heat generation characteristic) T1 of the coil assembly 11 and electricity generation characteristic (output current characteristic) of the coil assembly 11 of the magnetoelectric generator according to the first embodiment of the invention, both characteristics having experimentally been observed by the inventor(s) of the present application.

In FIG. 5, the driving rotation speed or number (rpm) of the magnetoelectric generator is taken along the abscissa, while along the left-hand ordinate is taken the temperature (° C.) of the coil assembly 11 with the output current (A) of the coil assembly 11 being taken along the right-hand ordinate. For the purpose of comparison, there are also shown the temperature characteristic of the magnetoelectric generator provided with no projecting portions 21, being represented by a broken curve T2 with the electricity generation characteristic (output current characteristic) thereof being indicated by G2. Parenthetically, the temperature is saturation temperature.

The results of the experiment has shown that in the case of the magnetoelectric generator according to the first embodiment of the invention, the temperature of the coil assembly 11 is remarkably low when compared with the example for comparison. Besides, the resistance value of the coil assembly 11 is low because of the low temperature, which in turn contributes to increasing of the electricity generation capability of the magnetoelectric generator. Thus, the magnetoelectric generator can enjoy significantly enhanced electricity generation efficiency.

The reason why the advantageous action and effect described above can be achieved with the structure of the magnetoelectric generator according to the first embodiment of the invention can be explained by the fact that because the projecting portions 21 protruding toward the stator 2 are formed in the peripheral edge portions of the ventilation holes 20 formed in the flywheel 3, turbulent air flows are produced around the projecting portions 21 upon rotation of the rotor 1, whereby heat transfer to the ambient air from the stator 2 is promoted by the turbulent air flows, as a result of which the air warmed under the heat transfer and of a relatively high atmospheric pressure flows to the exterior of a relatively low atmospheric pressure through the ventilation holes 20 under convection, and thus heat carried by the warmed air is radiated under the chimney effect, so to say.

As is apparent from the above, with the structure of the magnetoelectric generator described above, ventilation can effectively be realized internally of the flywheel 3 by virtue of the projecting portions 21 formed in the peripheral edge portions of the ventilation holes 20 of the flywheel 3 so as to protrude toward the stator 2, whereby high electricity generation efficiency can be ensured.

Besides, since the projecting portions 21 can be formed by a simple plastic deformation process with ease, the manufacturing cost of the magnetoelectric generator can significantly be reduced when compared with the conventional magnetoelectric generator in which the fins are formed by the insert mold forming.

Additionally, since the outer dimension of the bowl-like flywheel 3 remains substantially same as that of the flywheel of the conventional magnetoelectric generator, there will arise no necessity of changing the space required for installation of the generator.

Embodiment 2

Figure 6:
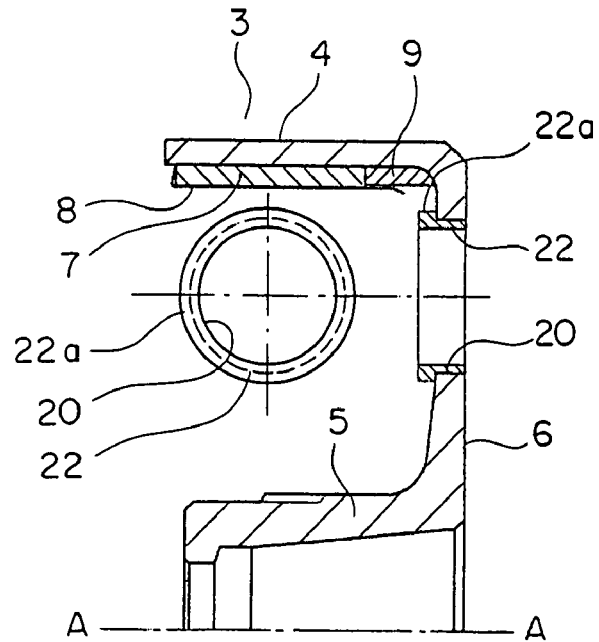
FIG. 6 is a sectional view showing a major portion of the flywheel of the magnetoelectric generator according to a second embodiment of the present invention.

FIG. 6 is a sectional view showing a major portion of the flywheel 3 of the magnetoelectric generator according to a second embodiment of the present invention. In the case of the magnetoelectric generator now concerned, a projection member 22 of a cylindrical shape having a collar 22a is press-fitted into each of the ventilation holes 20. The projection member 22 is made of an aluminum material which is a non-magnetic material exhibiting a high heat radiation property.

With the structure of the magnetoelectric generator according to the second embodiment of the invention, ventilation within the flywheel 3 can be promoted by press-fitting the projection member 22 into each of the ventilation holes 20, whereby electricity generation of high efficiency can be ensured similarly to the case of the magnetoelectric generator according to the first embodiment of the invention.

Further, since the collar 22a of the projection member 22 press-fitted into the ventilation hole 20 from the stator side serves as a positioning member, the projection member 22 can easily be mounted on the flywheel 3 with high assembling efficiency. Besides, by adjusting the size or dimension of the collar 22a in the direction toward the stator 2, the degree of turbulent flows of the air within the flywheel 3 can be adjusted with ease.

In addition, because the projection member 22 is made of aluminum material which is non-magnetic, the magnetic flux generated by the permanent magnets 7 is forcibly caused to thread through the stator 2 positively without flowing into the projection member 22 (i.e., without bringing about the so-called magnetic shunting), whereby degradation of the electricity generation efficiency due to leakage of the magnetic flux can positively suppressed or prevented.

Embodiment 3

Figure 7:
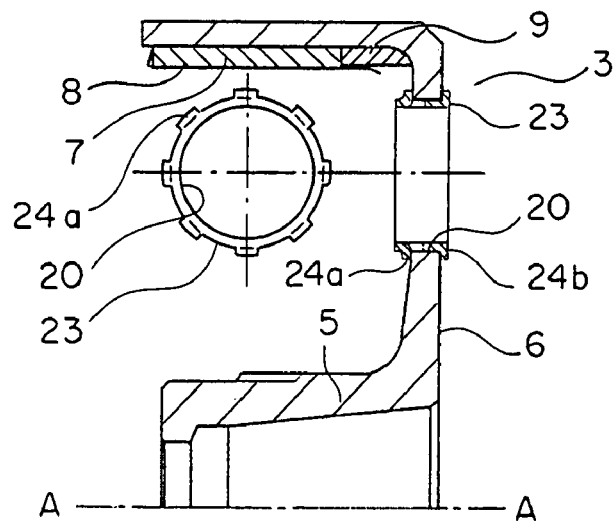
FIG. 7 is a sectional view showing a major portion of the flywheel of the magnetoelectric generator according to a third embodiment of the present invention.
Figure 8:
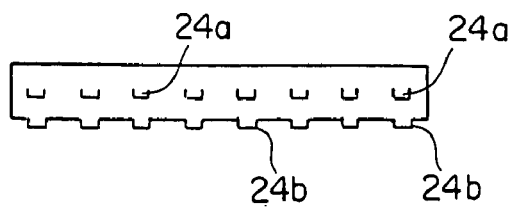
FIG. 8 is an exploded view showing a projection member shown in FIG. 7.

FIG. 7 is a sectional view showing a major portion of the flywheel 3 of the magnetoelectric generator according to a third embodiment of the present invention. In the case of the magnetoelectric generator now concerned, a projection member 23 is fixedly secured to each of the ventilation holes 20. This projection member 23 is formed of a plate- or sheet-like member having a plurality of notched portions 24a and 24b formed equi-distantly (see FIG. 8) and bent or rolled into a cylindrical or sleeve-like form. After having inserted the projection member 23 of the cylindrical form into the ventilation hole 20, the notched portions 24a and 24b are bent so that the projection member 23 can be secured fixedly to the ventilation hole 20.

With the structure of the magnetoelectric generator according to the third embodiment of the invention, by securing the projection member 23 to the ventilation hole 20, ventilation within the flywheel 3 can be promoted, whereby high electricity generation efficiency can be ensured similarly to the case of the magnetoelectric generator according to the first embodiment of the invention.

Further, the projection member 23 can be fixedly secured to the flywheel 3 with ease.

Embodiment 4

Figure 9:
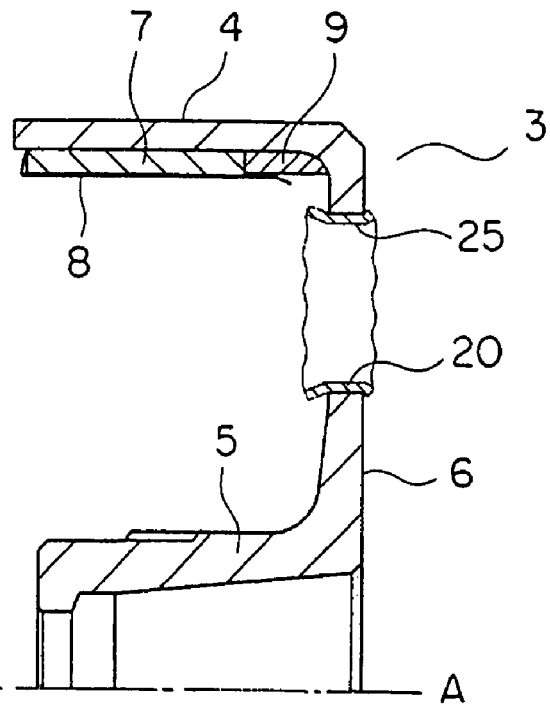
FIG. 9 is a sectional view showing a major portion of the flywheel of the magnetoelectric generator according to a fourth embodiment of the present invention.

FIG. 9 is a sectional view showing a major portion of the flywheel 3 of the magnetoelectric generator according to a fourth embodiment of the present invention. In the case of the magnetoelectric generator according to the instant embodiment, a projection member 25 is fixedly secured to the ventilation hole 20. The projection member 25 is formed of a sleeve-like or cylindrical member. After having inserted the projection member 25 of the cylindrical form into each of the ventilation holes 20, the projection member 25 is fixedly secured to the ventilation hole 20 by high-spin caulking.

With the structure of the magnetoelectric generator according to the fourth embodiment of the invention, by securing the projection member 25 to the ventilation hole 20, ventilation within the flywheel 3 can be promoted, whereby high electricity generation efficiency can be ensured similarly to the case of the magnetoelectric generator according to the first embodiment of the invention.

Further, the projection member 25 can be fixedly secured to the ventilation hole 20 with ease.

Embodiment 5

Figure 10:
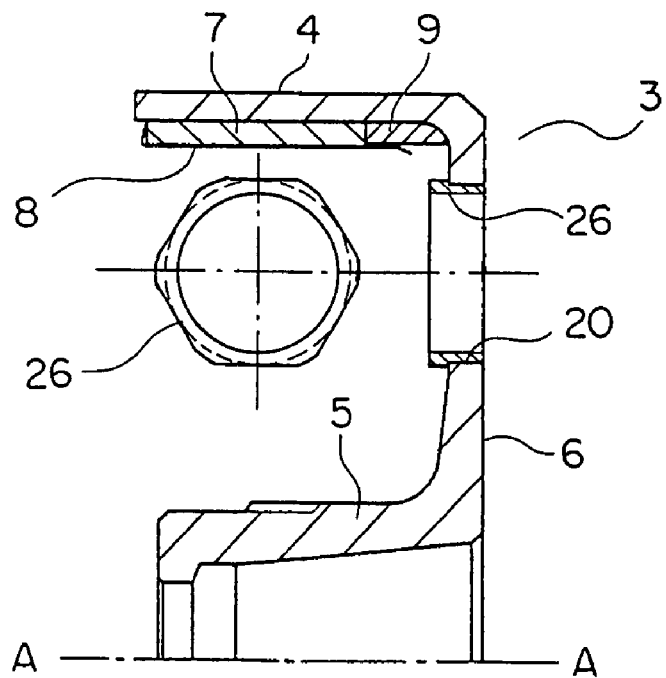
FIG. 10 is a sectional view showing a major portion of the flywheel of the magnetoelectric generator according to a fifth embodiment of the present invention.

FIG. 10 is a sectional view showing a major portion of the flywheel 3 of the magnetoelectric generator according to a fifth embodiment of the present invention. In the case of the magnetoelectric generator according to the instant embodiment, a projection member 26 is fixedly secured to the ventilation hole 20. The projection member 26 is formed of a polygonal member. After having inserted the projection member 26 of polygonal shape into each of the ventilation holes 20, the projection member 26 is fixedly secured to the ventilation hole 20 by adhesion or bonding.

With the structure of the magnetoelectric generator according to the fifth embodiment of the invention, owing to the projection member 26 secured to the ventilation hole 20, ventilation within the flywheel 3 can be promoted, whereby electricity generation of high efficiency can be ensured similarly to the case of the magnetoelectric generator according to the first embodiment of the invention.

Further, the projection member 26 can be fixedly secured to the ventilation hole 20 with ease.

Embodiment 6

Figure 11:
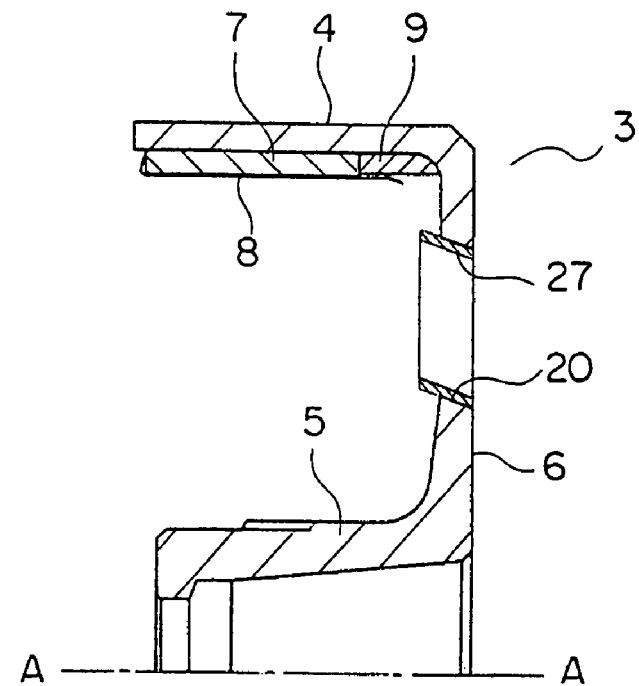
FIG. 11 is a sectional view showing a major portion of the flywheel of the magnetoelectric generator according to a sixth embodiment of the present invention.

FIG. 11 is a sectional view showing a major portion of the flywheel 3 of the magnetoelectric generator according to a sixth embodiment of the present invention. In the case of the magnetoelectric generator now concerned, a projection member 27 is fixedly secured to the ventilation hole 20. The projection member 27 is directed or orientated toward the permanent magnets 7 and the coils 11, being inclined relative to the rotation axis A—A.

With the structure of the magnetoelectric generator according to the sixth embodiment of the invention, owing to the projection member 27 secured to the ventilation hole 20, ventilation within the flywheel 3 can be promoted, whereby electricity generation of enhanced efficiency can be ensured similarly to the case of the magnetoelectric generator according to the first embodiment of the invention.

Further, since the projection member 27 is orientated or directed toward the permanent magnets 7 and the coils 11 where high temperature rise is expected, heat generated by the permanent magnets 7 and the coils 11 can be dissipated very effectively.

Embodiment 7

Figure 12:
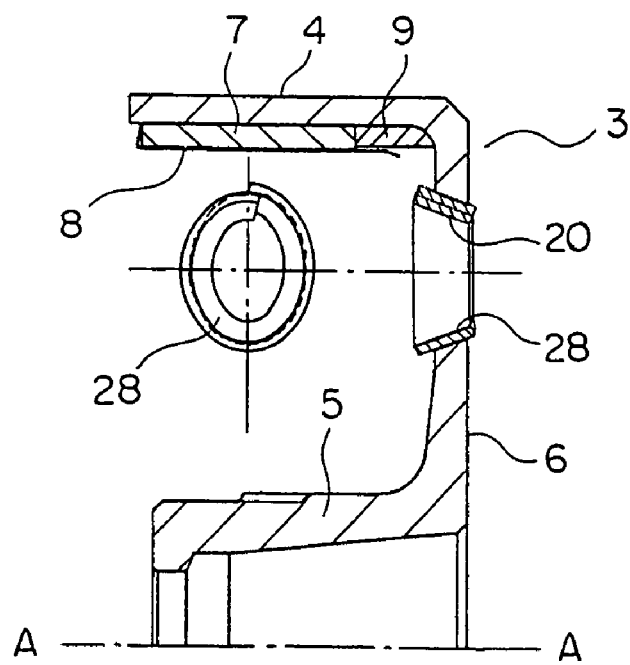
FIG. 12 is a sectional view showing a major portion of the flywheel of the magnetoelectric generator according to a seventh embodiment of the present invention.

FIG. 12 is a sectional view showing a major portion of the flywheel 3 of the magnetoelectric generator according to a seventh embodiment of the present invention. In the case of the magnetoelectric generator now concerned, a projection member 28 is fixedly secured to the ventilation hole 20. The projection member 28 is inserted into each of the ventilation holes 20 substantially in the form of a truncated cone and fixedly secured to the ventilation hole 20 by welding, being flared internally of the flywheel 3.

With the structure of the magnetoelectric generator according to the seventh embodiment of the invention, owing to the projection member 28 secured to the ventilation hole 20, ventilation within the flywheel 3 can be promoted, whereby high electricity generation efficiency can be ensured similarly to the case of the magnetoelectric generator according to the first embodiment of the invention.

Further, since the projection member 28 of a tapered form in cross-section flares out toward the stator 2, the warmed air within the flywheel 3 can effectively be discharged to the exterior under the chimney effect. Thus, heat generated by the permanent magnets 7 and the coils 11 can be dissipated very effectively.

Embodiment 8

Figure 13:
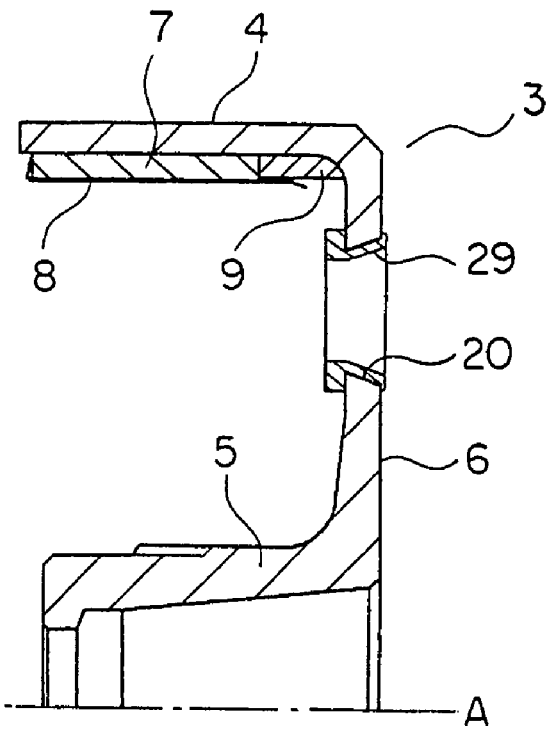
FIG. 13 is a sectional view showing a major portion of the flywheel of the magnetoelectric generator according to an eighth embodiment of the present invention.

FIG. 13 is a sectional view showing a major portion of the flywheel 3 of the magnetoelectric generator according to an eighth embodiment of the present invention. In the case of the magnetoelectric generator according to the instant embodiment, a projection member 29 is fixedly secured to the ventilation hole 20. The projection member 29 is formed of a cylindrical member inserted into each of the ventilation holes 20 to be fixedly secured thereto by plastic deformation, being flared outwardly from the flywheel 3.

With the structure of the magnetoelectric generator according to the eighth embodiment of the invention, owing to the projection member 29 secured to the ventilation hole 20, ventilation within the flywheel 3 can be promoted, whereby electricity generation of high efficiency can be ensured similarly to the case of the magnetoelectric generator according to the first embodiment of the invention.

Further, since the projection member 29 of a tapered shape in cross-section flares outwardly from the flywheel 3, the air of low temperature introduced into the interior of the magnetoelectric generator is effectively discharged through the flared opening of the flywheel 3. Thus, the permanent magnets 7 and the coils 11 can be cooled very effectively.

Embodiment 9

Figure 14:
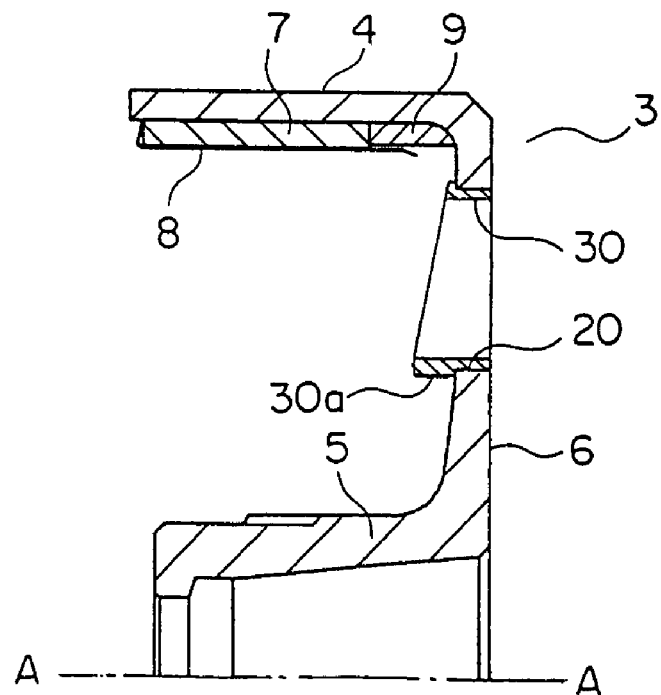
FIG. 14 is a sectional view showing a major portion of the flywheel of the magnetoelectric generator according to a ninth embodiment of the present invention.

FIG. 14 is a sectional view showing a major portion of the flywheel 3 of the magnetoelectric generator according to a ninth embodiment of the present invention. In the case of the magnetoelectric generator according to the instant embodiment, a projection member 30 is fixedly secured to the ventilation hole 20. This projection member 30 is fixedly press-fitted into each of the ventilation holes 20 in such disposition that the opened inner end portion of the projection member 30 is orientated or directed toward the permanent magnets 7 with a collar 30a of the projection member 30 bearing against the inner peripheral edge portion of the ventilation hole 20.

With the structure of the magnetoelectric generator according to the ninth embodiment of the invention, owing to the projection member 30 secured to the ventilation hole 20, as described above, ventilation within the flywheel 3 can be promoted, whereby electricity generation of high efficiency can be ensured similarly to the magnetoelectric generator according to the first embodiment of the invention.

Further, since the projection member 30 is opened toward the permanent magnets 7 whose temperature rise is undesirable among others, the cooling efficiency of the permanent magnets 7 can be enhanced above all.

Besides, the collar 30a of the projection member 30 press-fitted into the ventilation hole 20 from the stator side also functions as a positioning means for positioning the projection member 30 relative to the flywheel 3. Thus, the projection members 30 can be attached to the flywheel 3 with high efficiency. In addition, by adjusting the dimension of the collar 22a in the direction toward the stator 2, proper ventilation efficiency can easily be realized. Moreover, proper angle can be imparted to the opened end portion of the projection member 30 orientated toward the permanent magnets 7.

Finally, it should be added that in the magnetoelectric generators according to the third to ninth embodiments of the invention, the projection members 23, 24, 25, 26, 27, 28, 29 and 30 may be made of a non-magnetic material exhibiting high heat radiation property such as aluminum-based material.

The teachings of the present invention incarnated in the illustrative embodiments can find application to the magnetoelectric generators destined to be mounted on two-wheeled vehicles, outboard motors, snow mobiles and the like for supplying electric energy or power to onboard battery and other various onboard loads.

Many modifications and variations of the present invention are possible in the light of the above techniques. It is therefore to be understood that within the scope of the appended claims, the invention may be practiced otherwise than as specifically described.

What is claimed is:

1. A magnetoelectric generator comprising:
   a flywheel of a substantially bowl-like shape having a bottom portion formed with ventilation holes;
   a plurality of permanent magnets fixedly secured to an inner circumferential surface of said flywheel;
   a stator core disposed internally of said flywheel and having peripheral side surfaces facing in opposition to said permanent magnets; and
   an electricity generating coil assembly implemented by winding an electric conductor on said stator core,
   wherein electricity is generated under the effect of electromagnetic induction produced between said permanent magnets and said electricity generating coil assembly by rotating said flywheel, and
   wherein a peripheral edge portion of said ventilation hole is fixedly secured to a projection member, said projection member protruding toward said electricity generating coil assembly for producing turbulent flows of a fluid internally of said flywheel upon rotation of said flywheel,
   wherein said projection member is formed with collar portions provided at end portions of said projection member on opposite sides of said ventilation hole in an axial direction of said flywheel, and
   wherein each of said collar portions comprises a plurality of notched portions formed equidistantly around a circumferential edge of said end portions.

2. A magnetoelectric generator according to claim 1, wherein said projection member is made of a non-magnetic material.

3. A magnetoelectric generator according to claim 1 wherein said projection member is made of a heat radiative material.

4. A magnetoelectric generator according to claim 2, wherein said projection member is made of aluminum material.

* * * * *